US011613354B2

United States Patent
Zhao et al.

(10) Patent No.: US 11,613,354 B2
(45) Date of Patent: *Mar. 28, 2023

(54) METHOD AND DEVICE FOR CONTROLLING FLIGHT, CONTROL TERMINAL, FLIGHT SYSTEM AND PROCESSOR

(71) Applicant: SZ DJI TECHNOLOGY CO., LTD., Shenzhen (CN)

(72) Inventors: Tao Zhao, Shenzhen (CN); Guyue Zhou, Shenzhen (CN); Ang Liu, Shenzhen (CN); Xiao Hu, Shenzhen (CN); Litian Zhang, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/456,740

(22) Filed: Nov. 29, 2021

(65) Prior Publication Data
US 2022/0081114 A1    Mar. 17, 2022

Related U.S. Application Data

(63) Continuation of application No. 16/119,434, filed on Aug. 31, 2018, now Pat. No. 11,186,366, which is a (Continued)

(51) Int. Cl.
*B64C 39/02*    (2006.01)
*G05D 1/00*    (2006.01)
*G06F 3/0488*    (2022.01)
(Continued)

(52) U.S. Cl.
CPC ......... *B64C 39/024* (2013.01); *G05D 1/0016* (2013.01); *G05D 1/0038* (2013.01);
(Continued)

(58) Field of Classification Search
CPC ............ B64C 39/024; B64C 2201/127; B64C 2201/146; G05D 1/0038; G06F 3/0488; G08G 5/045; G08G 5/006
(Continued)

(56) References Cited

U.S. PATENT DOCUMENTS 8,521,339 B2 * 8/2013 Gariepy .............. G05D 1/0044
701/2
2005/0094851 A1    5/2005 Thorson
(Continued)

FOREIGN PATENT DOCUMENTS

CN        103135550 A    6/2013
CN        103345826 A    10/2013
(Continued)

OTHER PUBLICATIONS

The World Intellectual Property Organization (WIPO) International Search Report for PCT/CN2016/075174 dated Nov. 29, 2016 8 pages.

*Primary Examiner* — Isaac G Smith
(74) *Attorney, Agent, or Firm* — Anova Law Group, PLLC

(57) ABSTRACT

A method for controlling flight includes displaying, in a real-time manner, a picture photographed and sent by a photographing device carried by an aerial vehicle; determining a no-clicking area in the picture based on a position of an obstacle or a no-fly zone; receiving a click operation of a user on the picture; and controlling a flight of the aerial vehicle based on the click operation. Controlling the flight of the aerial vehicle based on the click operation includes invalidating the click operation in response to determining a click location of the click operation being in the no-clicking area; and controlling the flight of the aerial vehicle based on
(Continued)

a position of the click location in response to determining the click location being not in the no-clicking area.

20 Claims, 8 Drawing Sheets

Related U.S. Application Data continuation of application No. PCT/CN2016/075174, filed on Mar. 1, 2016.

(51) Int. Cl.
*G08G 5/04* (2006.01)
*G08G 5/00* (2006.01)

(52) U.S. Cl.
CPC ........... *G06F 3/0488* (2013.01); *G08G 5/045* (2013.01); *B64C 2201/127* (2013.01); *B64C 2201/146* (2013.01); *G08G 5/006* (2013.01); *G08G 5/0069* (2013.01)

(58) Field of Classification Search
USPC ............................................. 701/2
See application file for complete search history.

(56) References Cited

U.S. PATENT DOCUMENTS

| | | | |
|---|---|---|---|
| 2012/0235947 A1* | 9/2012 | Yano | G01C 21/3664 345/173 |
| 2016/0241767 A1 | 8/2016 | Cho et al. | |
| 2017/0108857 A1* | 4/2017 | Line | G05D 1/0038 |

FOREIGN PATENT DOCUMENTS

| | | |
|---|---|---|
| CN | 103365298 A | 10/2013 |
| CN | 104111659 A | 10/2014 |
| CN | 104503462 A | 4/2015 |
| CN | 104917966 A | 9/2015 |
| CN | 104932527 A | 9/2015 |
| CN | 105000170 A | 10/2015 |
| CN | 105247593 A | 1/2016 |
| CN | 105283816 A | 1/2016 |
| CN | 107318268 A | 11/2017 |
| TW | 201207676 A | 2/2012 |
| WO | 2016101227 A1 | 6/2016 |

* cited by examiner

METHOD AND DEVICE FOR CONTROLLING FLIGHT, CONTROL TERMINAL, FLIGHT SYSTEM AND PROCESSOR

CROSS-REFERENCE TO RELATED APPLICATIONS

This application is a continuation of U.S. application Ser. No. 16/119,434, filed on Aug. 31, 2018, which is a continuation of International Application No. PCT/CN2016/075174, filed on Mar. 1, 2016, the entire contents of both of which are incorporated herein by reference.

TECHNICAL FIELD

The present disclosure relates to unmanned aerial vehicle technique, and in particular to a method and a device for controlling flight, a control terminal, a flight system, a computer processor and a memory.

BACKGROUND

With the continuous development of control technology, the unmanned aerial vehicle applications also become widely available, particularly in terms of aerial survey, aerial photography, flight services, or the like. An unmanned aerial vehicle is constantly developing and improving, and will play an important role in the future.

At present, a flight direction of the unmanned aerial vehicle is usually controlled by using a rocker or a button. When the unmanned aerial vehicle comes into a user's sight, the user may control its ascending, descending or left-right rotation according to the specific position of the aerial vehicle. However, once the aerial vehicle is out of the user's sight, the user can only take a blind-control of the flight direction of the aerial vehicle since he/she loses sight of the aerial vehicle, which brings the user with inconvenience and easily causes flight accidents.

SUMMARY

In accordance with the disclosure, there is provided a method for controlling flight including displaying prompt information in a picture received from an aerial vehicle, dividing the picture into at least two portions based on the prompt information, obtaining a location of a click operation on the picture, and controlling a flight direction of the aerial vehicle based on the location and the prompt information.

Also in accordance with the disclosure, there is provided a control terminal including a touch screen and a controller electrically connected to the touch screen. The touch screen is configured to display a picture received from an aerial vehicle. The controller is configured to control the touch screen to display prompt information in the picture, divide the picture into at least two portions based on the prompt information, obtain a location of a click operation on the picture, and control a flight direction of the aerial vehicle based on the location and the prompt information.

The method and device for controlling flight, the control terminal, the flight system, the computer processor and the memory provided in the embodiment of the present disclosure, by displaying the prompt information in the photographed picture sent back by the aerial vehicle, obtaining the location information clicked by the user on the picture and controlling the flight direction of the aerial vehicle based on the location information of the click operation by the user and the prompt information, enable the user to intuitively control the flight direction of the aerial vehicle based on the specific location of the aerial vehicle, so as to provide users with a convenience, effectively prevent the occurrence of flight accidents and improve the safety of the aerial vehicle.

DETAILED DESCRIPTION

The technical solutions in the embodiments of the present disclosure will now be distinctly and completely described in conjunction with the accompanying drawings in the embodiments of the present disclosure. It will be apparent that the described embodiments are merely a part of the embodiments of the disclosure and are not intended to be exhaustive. All the other embodiments obtained by those skilled in the art based on the embodiments in the present disclosure without making creative work are within the scope of the present disclosure.

Unless otherwise defined, all the technical and scientific terms used herein have the same meaning as commonly understood by those skilled in the art to which this disclosure pertains. The terms used in the specification of the present disclosure are for the purpose of describing specific embodiments only and are not intended to limit the disclosure. The term "and/or" used herein includes any and all combinations of one or more of the associated listed items.

Some embodiments of the present disclosure will now be described in detail with reference to the accompanying drawings. The following embodiments and the features thereof may be combined with each other without conflict.

Figure 1:
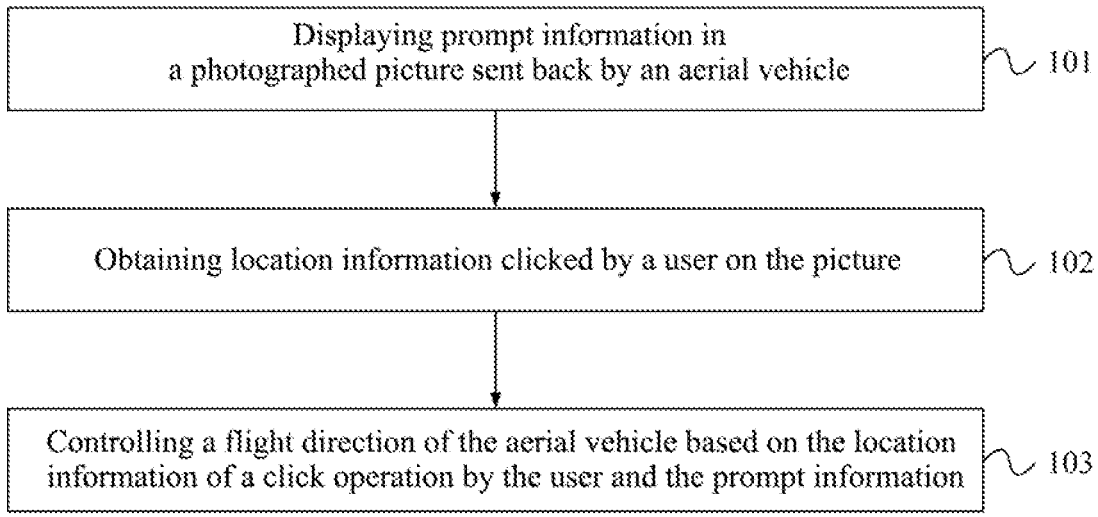
FIG. 1 is a flow chart of a method for controlling flight consistent with the present disclosure.

The present disclosure provides a method for controlling flight. FIG. 1 is a flow chart of the method for controlling flight according to some embodiments of the present disclosure. As shown in FIG. 1, the method for controlling flight may comprise:

Step 101: displaying, prompt information, in a photographed picture sent back by an aerial vehicle.

In some embodiments, an execution body may be a control terminal for a user's operation. In some embodiments, the control terminal may be any terminal having a display screen, such as a mobile phone, a tablet computer, a remote controller, or the like. The display screen may be a touch screen.

The control terminal may communicate with the aerial vehicle, and may control a flight direction, speed, or the like of the aerial vehicle, so as to achieve a normal flight of the aerial vehicle. A photographing device may be provided in the aerial vehicle. During a flight process, the aerial vehicle may send the picture photographed by the photographing device back to the control terminal in real time. The control terminal may display the photographed picture sent back by the aerial vehicle in the display screen.

In this step, in addition to the photographed picture sent back by the aerial vehicle, the control terminal may also display prompt information in the photographed picture. The prompt information is configured to enable the user to intuitively feel that how many portions the photographed picture is divided into. The prompt information may be implemented in various ways, for example, it may be lines, dots, arrows, colors, shadows, text, or the like.

The controller may divide the picture into at least two portions based on the prompt information. The size and shape of each portion of the at least two portions may be the same or different. Each portion represents a different flight direction, for example, it may represent flying upwards, or flying obliquely upward, or maintaining the current flight direction.

Step 102: obtaining, location information clicked by the user on the picture.

The user, after catching the sight of the prompt information, may roughly understand that how many portions the picture is divided into. The user may easily select a pointing direction based on the prompt information. When expecting the aerial vehicle to fly along a certain direction, the user may click on an area corresponding to the direction.

Specifically, the user may click on a certain location of the picture by touching the display screen. The control device can obtain the location information of the click operation by the user on the picture. The location information may be coordinate information or relative location information with respect to the prompt information.

Step 103: controlling, the flight direction of the aerial vehicle, based on the location information of a click operation by the user and the prompt information.

Specifically, the aerial vehicle is controlled to fly along a first direction if the location information is located in a first portion of the at least two portions. The aerial vehicle is controlled to fly along a second direction if the location information is located in a second portion of the at least two portions.

In actual application, the aerial vehicle may send the photographed picture back to the control device in real time, and the user may see the picture by using the control device; meanwhile, the prompt information displayed on the picture can be used for clicking on a certain location in the picture. The control device may control the aerial vehicle to fly along a direction corresponding to the location, which is more intuitive comparing with a method for controlling the traditional aerial vehicle using a rocker or a button. Even if the aerial vehicle is out of the user's sight, the user may know the current environment of the aerial vehicle in real time according to the photographed picture, and may easily control the direction of the aerial vehicle by clicking on the picture.

The method for controlling flight, by displaying the prompt information in the photographed picture sent back by the aerial vehicle, obtaining the location information of the click operation by the user on the picture and controlling the flight direction of the aerial vehicle according to the location information of the click operation by the user and the prompt information, enables the user to intuitively control the flight direction of the aerial vehicle based on the specific location of the aerial vehicle, so as to provide users with a convenience, effectively prevent the occurrence of flight accidents and improve the safety of the aerial vehicle.

In some embodiments, a direction of the obstacle or no-fly zone with respect to the aerial vehicle is determined if there is a specific obstacle or no-fly zone within a preset distance of the aerial vehicle, and a portion of the photographed picture corresponding to the direction is set as a no-clicking area to invalidate a click operation of the user on the portion.

An additional prompt sign may be set in the no-clicking area. For example, the no-clicking area may be covered with red color or shadow, or words of "!" or "no-fly zone", or the like may be displayed in the no-clicking area for facilitating the user to know the nature of the area.

If the location of the click operation by the user is in the no-clicking area, the click operation is directly judged to be invalid. That is, the control device will not send any control information to the aerial vehicle to control the aerial vehicle to change the current flight state based on this click. The user's operation in the no-clicking area will not have any effect on the flight of the aerial vehicle.

Wherein the specific obstacle or no-fly zone is an obstacle or no-fly zone with a range greater than a preset threshold. The range may refer to a volume or a cross-sectional area of the obstacle or no-fly zone, or a projected area of the obstacle or no-fly zone in the flight direction of the aerial vehicle. The preset threshold may be set according to actual needs. In particular, the greater range of no-clicking area may be ceilings, floors, larger buildings, or the like.

The range of the obstacle or no-fly zone may be determined through various methods. For example, it may be obtained by a detection device, such as a radar, or may be determined by image analyzing and processing or the like.

The nature of the no-fly zone can be defined according to actual needs. For example, the no-fly zone may be an area having a distance from the ground less than the preset threshold.

Setting the corresponding no-clicking area in the photographed picture when the aerial vehicle is close to a specific obstacle or no-fly zone can effectively prevent the aerial vehicle from crashing into the obstacle or the no-fly zone, thereby improving the safety and reliability of the aerial vehicle.

Further, after the user clicks on the no-clicking area, a reminder message can be sent to the user to remind the user that this area is a no-clicking area. The reminder message may be text, picture, video, audio, or the like.

In some embodiments, before displaying the prompt information in a displayed photographed picture, the method further comprises:

Determining, a base line in the photographed picture based on attitude information of the photographing device, and determining, the prompt information based on the base line. Wherein the base line may be a straight line or a curve line.

The attitude information of the photographing device refers to the state information between the photographing device with respect to a certain base line or a certain reference plane or a fixed coordinate system. In most cases, the attitude information of the photographing device is identical with the flight attitude of the aerial vehicle. In some cases, the photographing device may be tilted to top, bottom, left or right with respect to the aerial vehicle, and the attitude information of the photographing device may be different from the flight attitude of the aerial vehicle.

Determining the prompt information through the base line can enable the prompt information to be more in line with the current attitude information of the photographing device, thereby bringing the user more intuitive experience.

The base line may be a horizontal line or a plumb line, or may be other related straight lines or curve lines. Description is now made by respectively reference to several embodiments.

Figure 2:
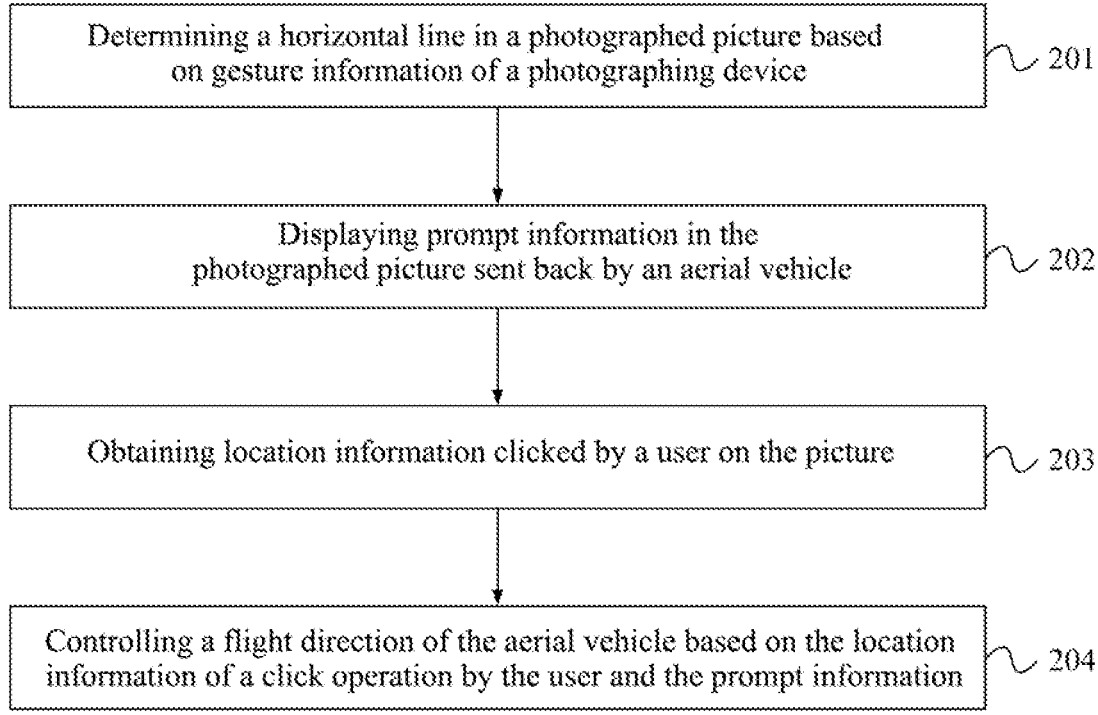
FIG. 2 is a flow chart of a method for controlling flight consistent with the present disclosure.

FIG. 2 is a flow chart of a method for controlling flight according to some embodiments of the present disclosure. According to the method shown in FIG. 2, a horizontal line is taken as a base line, and prompt information is determined based on the base line. The method shown in FIG. 2 may comprise:

Step 201: determining, a horizontal line in a photographed picture based on attitude information of a photographing device.

Specifically, the attitude information of the photographing device may be determined through a sensor, so that the horizontal line in the photographed picture is determined. Correspondingly, the prompt information may be used to represent a relative position relationship between each portion of the photographed picture and the horizontal line.

Step 202: displaying, prompt information in the photographed picture sent back by an aerial vehicle.

Step 203: obtaining, location information clicked by a user on the picture.

Step 204: controlling, a flight direction of the aerial vehicle based on the location information of a click operation by the user and the prompt information.

Step 202 to step 204 are similar to step 101 to step 103 shown in FIG. 1, and will not be described again here.

In some embodiments, the picture may be divided into two portions by the control device according to the prompt information. The first portion may be an area above the horizontal line, and the second portion may be an area below the horizontal line. Correspondingly, the direction corresponding to the first portion is an ascending direction, and the direction corresponding to the second portion is a descending direction. The horizontal line may be a horizontal line in a preset height or a horizontal line in a height at which the aerial vehicle is before the click operation of the user.

If the location information of the click operation by the user is located in the first portion, the aerial vehicle is controlled to fly along a certain direction above the horizontal line. If the location information of the click operation by the user is located in the second portion, the aerial vehicle is controlled to fly along a certain direction below the horizontal line.

Figure 3:
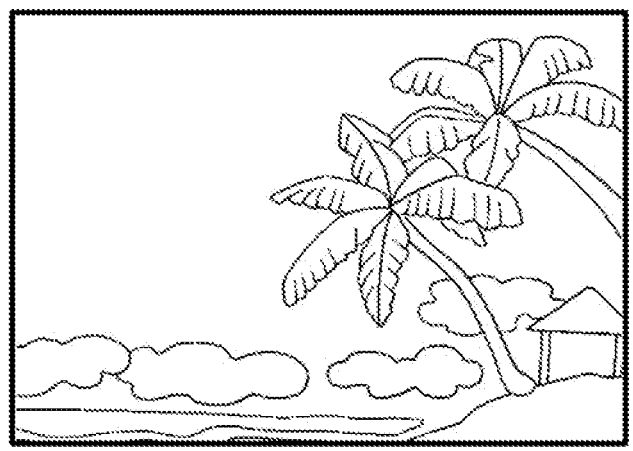
FIG. 3 is a schematic view of a photographed picture photographed by using the method for controlling flight consistent with the present disclosure and sent back by an aerial vehicle.
Figure 4:
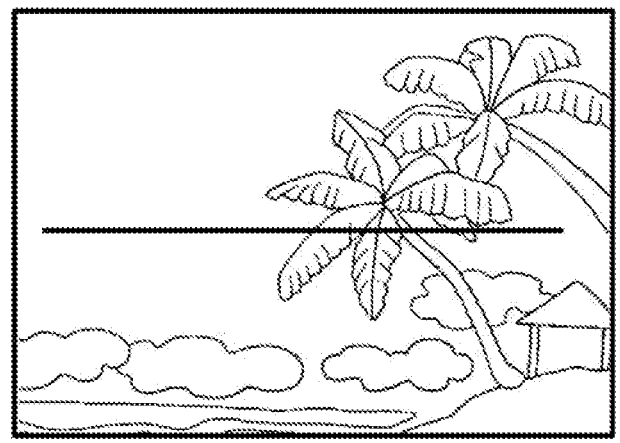
FIG. 4 is a schematic view of a photographed picture photographed by using the method for controlling flight consistent with the present disclosure and added with a horizontal line.

The prompt information may be a horizontal line. FIG. 3 is a schematic view of a photographed picture photographed by using the method for controlling flight described above in connection with FIG. 2 and sent back by an aerial vehicle. FIG. 4 is a schematic view of a photographed picture photographed by using the method for controlling flight described above in connection with FIG. 2 and added with the horizontal line. As shown in FIGS. 3 and 4, the horizontal line is added to the photographed picture. The area above the horizontal line is a first portion and corresponds to an ascending direction; and the area below the horizontal line is a second portion and corresponds to a descending direction.

Figure 5:
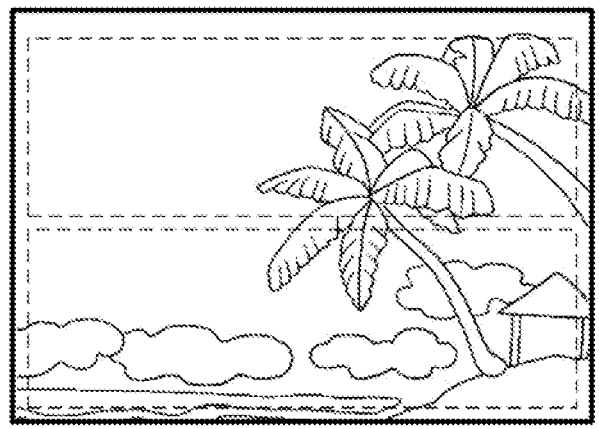
FIG. 5 is a schematic view of a photographed picture photographed by using the method for controlling flight consistent with the present disclosure and added with color information.

Alternatively, the prompt information may include the color information added to each portion of the picture, and different color information represents different flight direction. FIG. 5 is a schematic view of a photographed picture photographed by using the method for controlling flight described above in connection with FIG. 2 and added with color information. In FIG. 5, the upper dashed box may be filled with a first color, and the lower dashed box may be filled with a second color. The flight directions corresponding to different areas are distinguished via colors on the basis of ensuring that that the user can see the original picture.

The areas filled with different colors correspond to different flight directions. As shown in FIG. 5, in the photographed picture, the area framed by the upper dashed box is the first portion and corresponds to the ascending direction; and the area framed by the lower dashed box is the second portion and corresponds to the descending direction.

Figure 6:
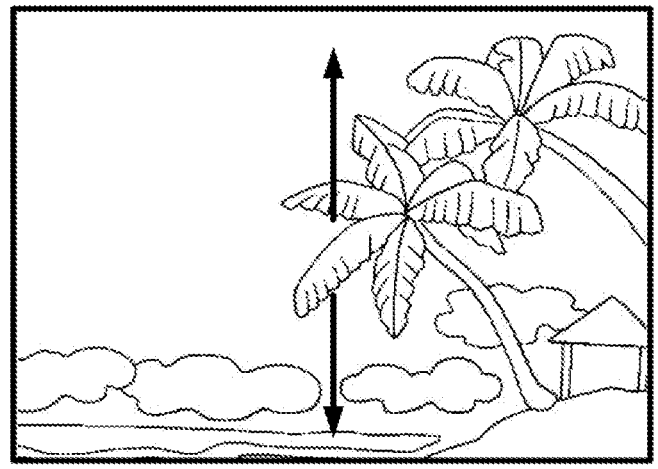
FIG. 6 is a schematic view of a photographed picture photographed by using the method for controlling flight consistent with the present disclosure and added with arrows.

Alternatively, the prompt information may include markup information provided in each portion of the picture. Different markup information represents different flight direction, and the markup information can be an arrow, a character or the like. FIG. 6 is a schematic view of a photographed picture photographed by using the method for controlling flight described above in connection with FIG. 2 and added with arrows. The ascending arrow may be provided above the horizontal line (not shown), and the descending arrow may be provided below the horizontal line.

As shown in FIG. 6, the area around the ascending arrow is the first portion and corresponds to the ascending direction, and the area around the descending arrow is the second portion and corresponds to the descending direction.

Of course, the prompt information may also have other representations, and the present disclosure is not limited thereto.

In the method for controlling flight, the picture is divided into two portions by using a horizontal line as the base line and determining prompt information based on the base line. The area above the horizontal line corresponds to the ascending direction, and the area below the horizontal line corresponds to the descending direction, which enable the users to intuitively determine a corresponding relationship between the area and the flight direction as well as the current location of the aerial vehicle, thereby further providing convenience for the users' use.

The controller obtains a location clicked by a user on the picture. If a target point at the location is obtained, the aerial vehicle is controlled to fly toward the characteristic target point; or if a direction of a clicked location with respect to the present location is obtained, the aerial vehicle is controlled to fly along the direction.

When the aerial vehicle is controlled to fly toward the target point, in some embodiments, the method further comprises: determining, a flight distance of the aerial vehicle along the flight direction, based on a distance between the horizontal line and the location information of the click operation by the user on the photographed picture.

Specifically, if the location information of the click operation by the user is much higher than the horizontal line, the aerial vehicle may fly upward for a longer distance. If the location information of the click operation by the user is a little higher than the horizontal line, the aerial vehicle may fly upward for a shorter distance. If the location information of the click operation by the user is much lower than the horizontal line, the aerial vehicle may fly downward for a longer distance. If the location information of the click operation by the user is a little lower than the horizontal line, the aerial vehicle may fly downward for a shorter distance.

The corresponding relationship between a distance from the location information of the click operation by the user on the photographed picture to the horizontal line and a flight distance of the aerial vehicle along the flight direction can be set based on actual needs. For example, 1 cm in the picture represents an actual flight distance of 10 m. Alternatively, the corresponding relationship between a distance in the picture and an actual flight distance may be determined based on the information, such as the size and resolution of the display screen of the control device.

Determining a flight distance of the aerial vehicle along a flight direction based on a distance from the location information of the click operation by the user on the photographed picture to the horizontal line enables the user to directly determine the flight distance of the aerial vehicle along the flight direction by clicking on a certain location in the picture, thereby effectively improving the control efficiency.

Further, it is also possible to determine the corresponding no-clicking area based on a distance between a specific obstacle or a no-fly zone and the horizontal line. For example, if there is a specific obstacle at 100 m above the aerial vehicle, and an actual flight distance of 100 m corresponds to a distance of 10 cm in the picture, then an area within 10 cm above the horizontal line is the area that could be clicked on, and the area beyond 10 cm above the horizontal line is the no-clicking area.

Figure 7:
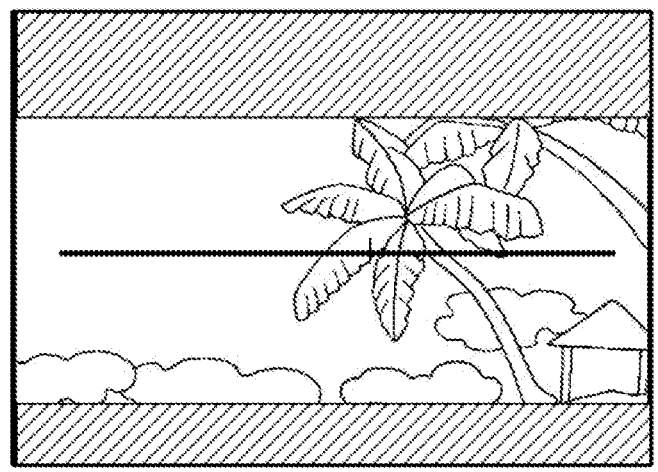
FIG. 7 is a schematic view of a photographed picture photographed by using the method for controlling flight consistent with the present disclosure and added with no-clicking areas.

FIG. 7 is a schematic view of a photographed picture photographed by using the method for controlling flight described above in connection with FIG. 2 and added with no-clicking areas. As shown in FIG. 7, the shaded portion is the no-clicking area. The user may intuitively see that, when a lower position in the area above the horizontal line is clicked on, the aerial vehicle can fly upward to a corresponding height normally. When a higher position (i.e., the shaded area) in the area above the horizontal line is clicked on, the aerial vehicle could not fly to the corresponding height, since there is an obstacle or no-fly area at the corresponding height. Specifically, when a distance between the aerial vehicle and the ground is less than a preset threshold, then the ground in the picture is set as a no-clicking area; or when an aerial vehicle is flying in a room, if a distance between the aerial vehicle and a ceiling is less than a preset threshold, then the ceiling is set as a no-clicking area. The aerial vehicle may not reflect when the no-clicking area in the picture is clicked on.

Determining the corresponding no-clicking area based on the distance between the specific obstacle or no-fly zone and the horizontal line enables the user to intuitively determine the approximate distance between the obstacle or no-fly zone and the current location of the aerial vehicle, thereby providing convenience for the user's control and ensuring the safety of flight.

Figure 8:
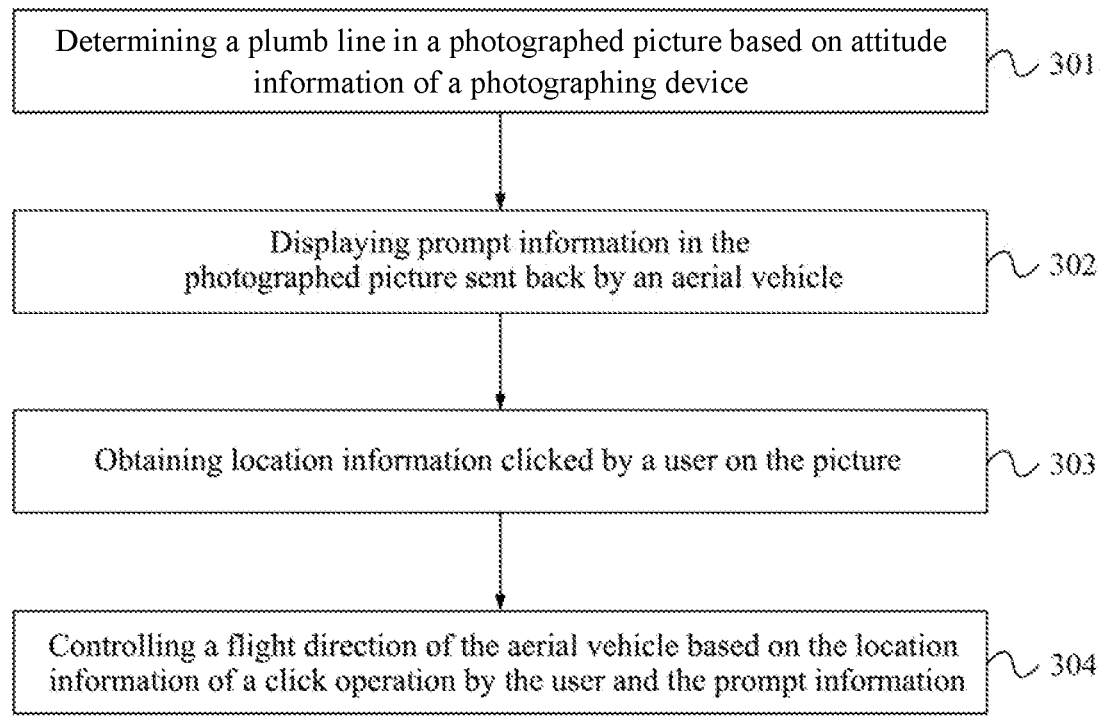
FIG. 8 is a flow chart of a method for controlling flight consistent with the present disclosure.

FIG. 8 is a flow chart of a method for controlling flight according to some embodiments of the present disclosure. According to the method shown in FIG. 8, a plumb line is taken as a base line, and prompt information is determined based on the base line. The method shown in FIG. 8 may comprise:

Step 301: determining, a plumb line in a photographed picture, based on attitude information of a photographing device.

Specifically, the attitude information of the photographing device may be determined by a sensor, so that the plumb line in the photographed picture is determined. Correspondingly, the prompt information may be used to represent a relative position relationship between each portion of the photographed picture and the plumb line.

Step 302: displaying, the prompt information in the photographed picture sent back by an aerial vehicle.

Step 303: obtaining, location information clicked by a user on the picture.

Step 304: controlling, a flight direction of the aerial vehicle, based on the location information of a click operation by the user and the prompt information.

Step 302 to step 304 are similar to step 101 to step 103 shown in FIG. 1, and will not be described again here.

In some embodiments, a control device may divide the picture into two portions according to the prompt information. A first portion may be an area on the left of the plumb line, and a second portion may be an area on the right of the plumb line. Correspondingly, the direction corresponding to the first portion can be a left direction, and the direction corresponding to the second portion can be a right direction.

If location information of the click operation by the user is located in the first portion, the aerial vehicle is controlled to fly leftward. If location information of the click operation by the user is located in the second portion, the aerial vehicle is controlled to fly rightward.

Figure 9:
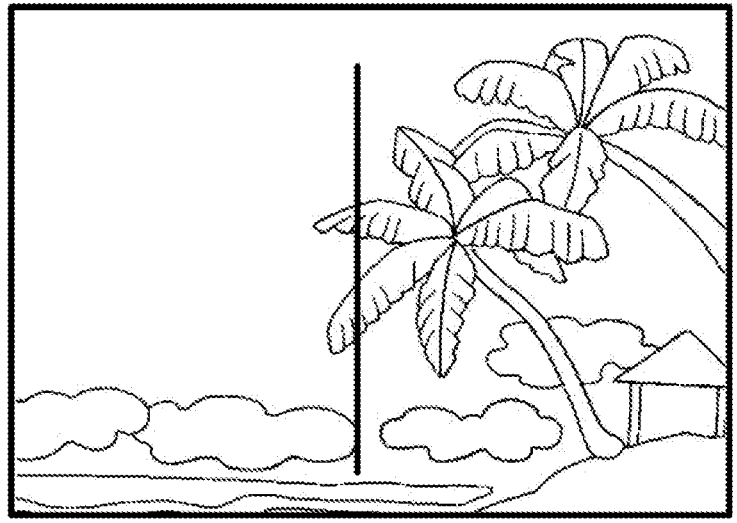
FIG. 9 is a schematic view of a photographed picture photographed by using the method for controlling flight consistent with the present disclosure and added with a plumb line.

The prompt information may be a plumb line. FIG. 9 is a schematic view of a photographed picture photographed by using the method for controlling flight described above in connection with FIG. 8 and added with a plumb line. As shown in FIG. 9, the plumb line is added to the photographed picture shown in FIG. 3. The area on the left of the plumb line is a first portion and corresponds to a left direction, and the area on the right of the plumb line is a second portion and corresponds to a right direction. The plumb line may be a left-right dividing line of the picture to which the nose direction of the aerial vehicle is directed, or may be a left-right dividing line of the picture photographed by the camera of the aerial vehicle.

Figure 10:
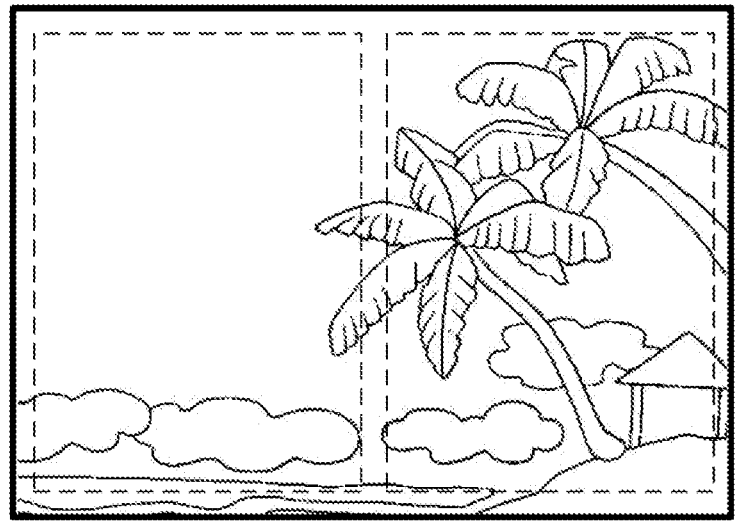
FIG. 10 is a schematic view of a photographed picture photographed by using the method for controlling flight consistent with the present disclosure and added with color information.

Alternatively, the prompt information may include color information added to each portion of the picture, and different color information represents different flight directions. FIG. 10 is a schematic view of a photographed picture photographed by using the method for controlling flight described above in connection with FIG. 8 and added with color information. In FIG. 10, a dashed box on the left may be filled with a first color, and a dashed box on the right may be filled with a second color. The flight directions corresponding to different areas are distinguished via colors on the basis of ensuring that the user can see the original picture.

The areas filled with different colors correspond to different flight directions. As shown in FIG. 10, in the photographed picture, an area framed by the dashed box on the left is a first portion and corresponds to a left direction, and an area framed by the dashed box on the right is a second portion and corresponds to a right direction.

Figure 11:
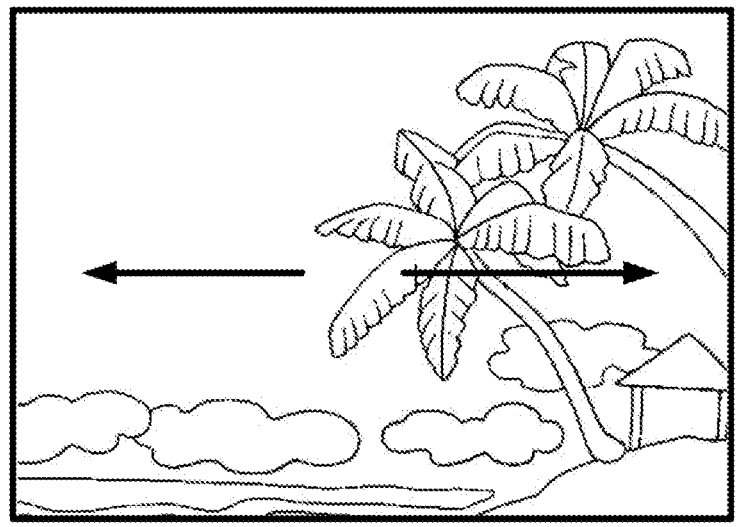
FIG. 11 is a schematic view of a photographed picture photographed by using the method for controlling flight consistent with the present disclosure and added with arrows.

Alternatively, the prompt information may include markup information provided in each portion of the picture. Different markup information represents different flight directions, and the markup information is an arrow, a character or the like. FIG. 11 is a schematic view of a photographed picture photographed by using the method for controlling flight described above in connection with FIG. 8 and added with arrows. The left arrow may be provided on the left of the horizontal line (not shown), and the right arrow may be provided on the right of the horizontal line.

As shown in FIG. 11, an area around the left arrow is the first portion and corresponds to the left direction, and an area around the right arrow is the second portion and corresponds to the right direction.

Of course, the prompt information may also have other representations, and the present disclosure is not limited thereto.

In the method for controlling flight, the picture is divided into two portions by using a plumb line as a base line and determining the prompt information based on the base line. The area on the left of the plumb line corresponds to the left direction, and the area on the right of the plumb line corresponds to the right direction, which enable the users to intuitively determine the corresponding relationship between each area and the flight direction, thereby providing convenience for the user's use.

The controller obtains a location clicked by a user on the picture. If a characteristic target point at the location is obtained, the aerial vehicle is controlled to fly toward the target point; or if a direction of the clicked location with respect to the present location is obtained, the aerial vehicle is controlled to fly along the direction.

When the aerial vehicle is controlled to fly toward the target point, in some embodiments, the method further comprises: determining, an angle by which an aerial vehicle rotated leftward or rightward, based on a distance between location information of the click operation by a user on the photographed picture and a plumb line.

Specifically, if the location information of the click operation by the user is much more leftward than the plumb line, the aerial vehicle may rotate toward left for a larger angle. If the location information of the click operation by the user is a little more leftward than the plumb line, the aerial vehicle may rotate toward left for a smaller angle. If the location information of the click operation by the user is much more rightward than the plumb line, the aerial vehicle may rotate toward right for a larger angle. If the location information of the click operation by the user is a little more rightward than the plumb line, the aerial vehicle may rotate toward right for a smaller angle.

The corresponding relationship between the distance from the location information of the click operation by the user on the photographed picture to the plumb line and the rotated angle of the aerial vehicle can be set based on actual needs. For example, 1 cm in the picture represents a rotated angle of 10°. Alternatively, the corresponding relationship between the distance in the picture and the rotated angle of the aerial vehicle may be determined based on the information, such as the size and resolution of the display screen of the control device.

Determining the rotated angle of the aerial vehicle based on the distance from the location information of the click operation by the user on the photographed picture to the plumb line enables the user to directly determine the rotated angle of the aerial vehicle by clicking on a certain location in the picture, thereby effectively improving the control efficiency.

Further, it is also possible to determine the corresponding no-clicking area based on the distance between a specific obstacle or no-fly zone and the plumb line, which enables the user to intuitively determine which angles are dangerous, thereby providing convenience for the user' control.

For example, in the direction an angle between which and the current advancing direction of the aerial vehicle is 45 degrees to 90 degrees, if there is an obstacle or no-fly zone in a preset distance, and the angle of 45 degrees corresponds to a distance of 4.5 cm in the picture, then an area within a range of 0 to 4.5 cm on the left of the plumb line is the area that could be clicked, and an area within a range of 4.5 cm to 9 cm on the left of the plumb line is the no-clicking area. The method for displaying the no-clicking area is similar to that of the abovementioned embodiment, and will not be described again here.

Figure 12:
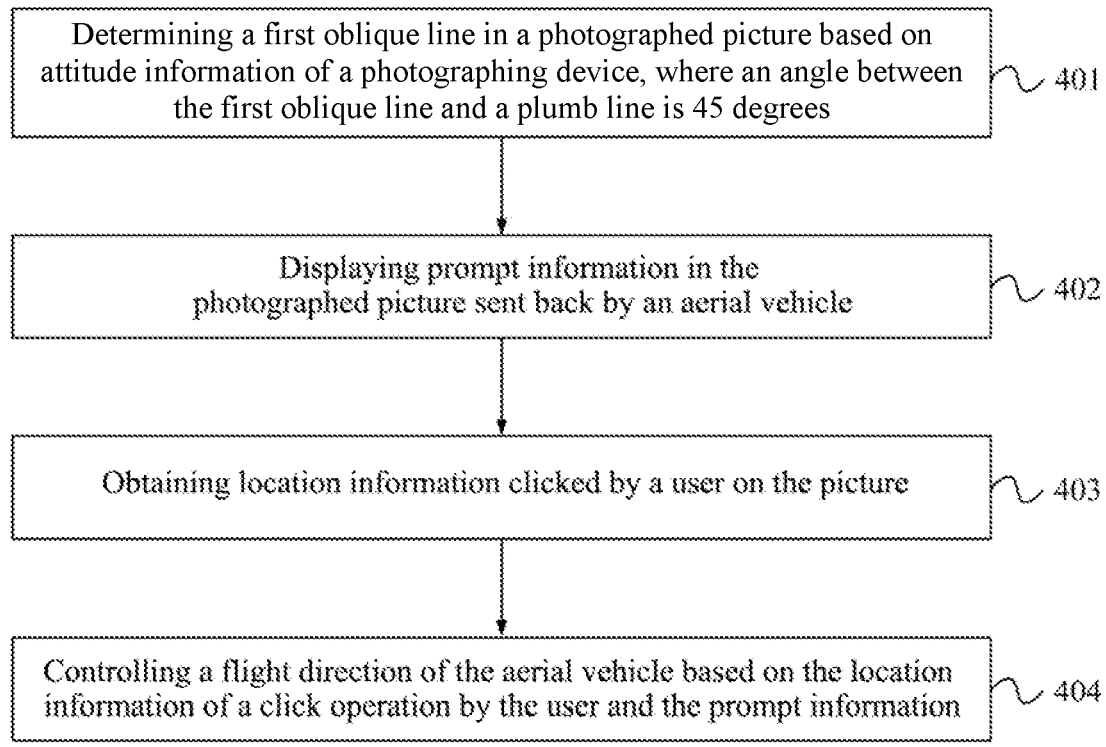
FIG. 12 is a flow chart of a method for controlling flight consistent with the present disclosure.

FIG. 12 is a flow chart of a method for controlling flight according to some embodiments of the present disclosure. According to the method shown in FIG. 12, an oblique line is taken as a base line, and prompt information is determined based on the base line. The method shown in FIG. 12 may comprise:

Step 401: determining, a first oblique line in a photographed picture based on attitude information of a photographing device, wherein an angle between the first oblique line and a plumb line is 45 degrees.

Specifically, the attitude information of the photographing device may be determined by a sensor. Then, the plumb line in the photographed picture is determined based on the attitude information of the photographing device, and then the first oblique line is determined.

Correspondingly, the prompt information may be used to represent a relative location relationship between each portion of the photographed picture and the first oblique line.

Step 402: displaying, the prompt information in the photographed picture sent back by an aerial vehicle.

Step 403: obtaining, location information clicked by a user on the picture.

Step 404: controlling, a flight direction of the aerial vehicle based on the location information of a click operation by the user and the prompt information.

Step 402 to step 404 are similar to step 101 to step 103 shown in FIG. 1, and will not be described again here.

In some embodiments, the control device may divide the picture into two portions according to the prompt information. The direction corresponding to the first portion is an upper left direction, and the direction corresponding to the second portion is a lower right direction; or the direction corresponding to the first portion is a lower left direction, and the direction corresponding to the second portion is an upper right direction.

Figure 13:
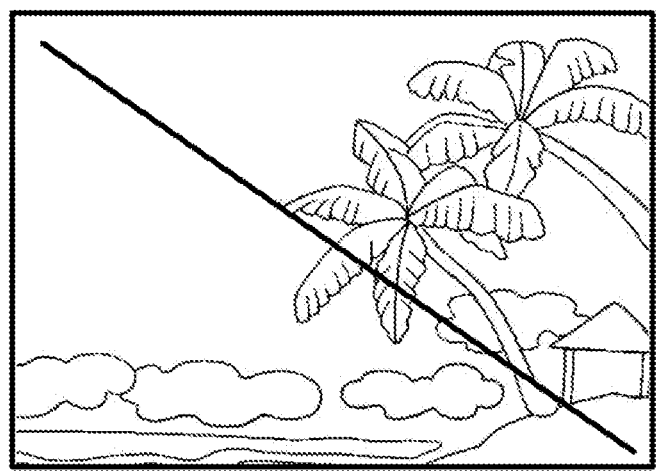
FIG. 13 is a schematic view of a photographed picture photographed by using the method for controlling flight consistent with the present disclosure and added with a first oblique line.

The prompt information may be the first oblique line. FIG. 13 is a schematic view of a photographed picture photographed by using the method for controlling flight described above in connection with FIG. 12 and added with the first oblique line. Of course, the prompt information may also have other representations. For example, the prompt information may include color information added to each portion of the picture, and different color information represents different flight directions. Alternatively, the prompt information may include markup information provided in each portion of the picture, and different markup information represents different flight directions. The displaying of the color information or markup information is similar to that of the abovementioned embodiments, and will not be described again here.

In the method for controlling flight, the picture is divided into two portions by using a first oblique line as a base line and determining the prompt information based on the base line, wherein the angle between the first oblique line and the plumb line is 45 degrees. The two portions respectively correspond to the upper left direction and the lower right direction, or the lower left direction and the upper right direction, which enable the users to control the flight of the aerial vehicle in those directions, thereby providing convenience for the user's use.

Figure 14:
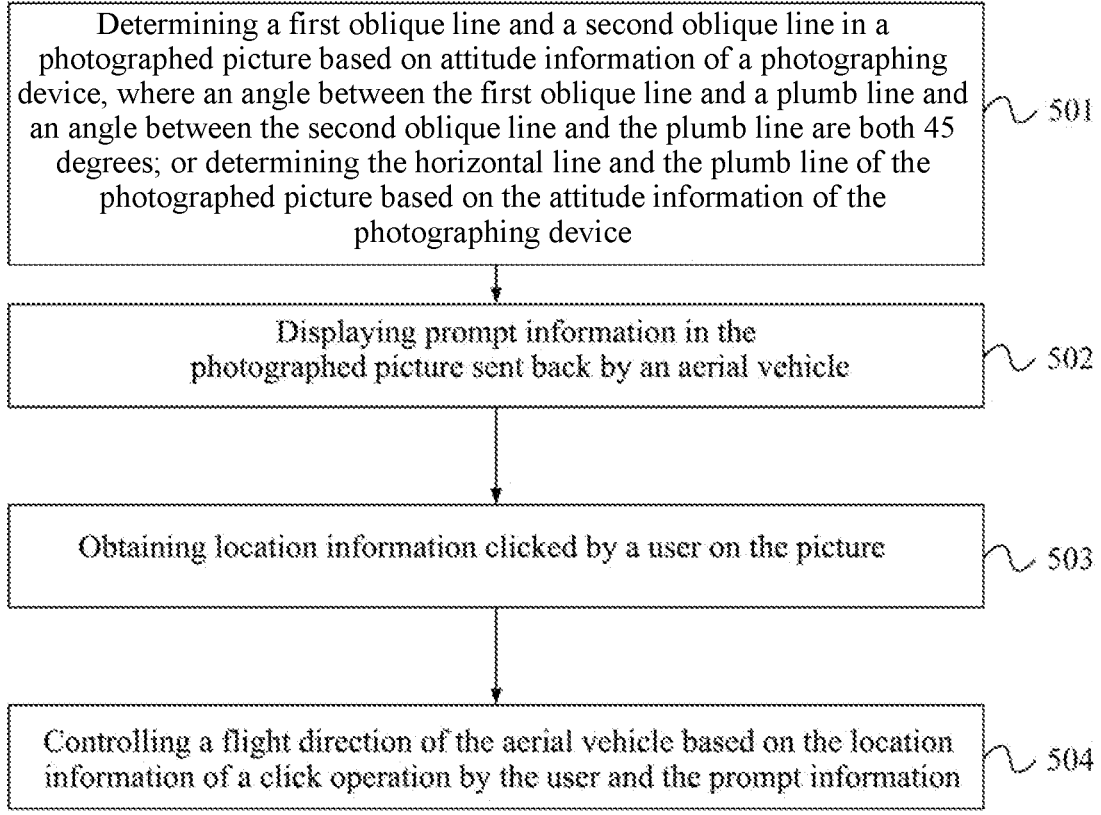
FIG. 14 is a flow chart of a method for controlling flight consistent with the present disclosure.

FIG. 14 is a flow chart of a method for controlling flight according to some embodiments of the present disclosure. According to the method shown in FIG. 14, two oblique lines, or a horizontal line and a plumb line are taken as base lines, which divide a picture into four portions corresponding to four different directions. The method shown in FIG. 14 may comprise:

Step 501: determining, a first oblique line and a second oblique line in a photographed picture, based on attitude information of a photographing device, wherein an angle between the first oblique line and a plumb line and an angle between the second oblique line and the plumb line are both 45 degrees; or determining, the horizontal line and the plumb line of the photographed picture, based on the attitude information of the photographing device.

Specifically, the attitude information of the photographing device may be determined by a sensor. Then, the plumb line and the horizontal line in the photographed picture are determined based on the attitude information of the photographing device. The first oblique line and the second oblique line may be determined based on the plumb line and the horizontal line. The angle between the first oblique line and the second oblique line may be 90 degrees.

Correspondingly, the prompt information may be used to represent a relative location relationship between each portion of the photographed picture and the first oblique line and the second oblique line. Alternatively, the prompt information may be used to represent a relative location relationship between each portion of the photographed picture and the plumb line and the horizontal line.

Step 502: displaying, the prompt information in the photographed picture sent back by an aerial vehicle.

Step 503: obtaining, location information clicked by a user on the picture.

Step 504: controlling, a flight direction of the aerial vehicle based on the location information of a click operation by the user and the prompt information.

Step 502 to step 504 are similar to step 101 to step 103 shown in FIG. 1, and will not be described again here.

In some embodiments, the control device may divide the picture into four portions according to the prompt information. The directions corresponding to the four portions may be a left direction, a right direction, an ascending direction and a descending direction, respectively.

Figure 15:
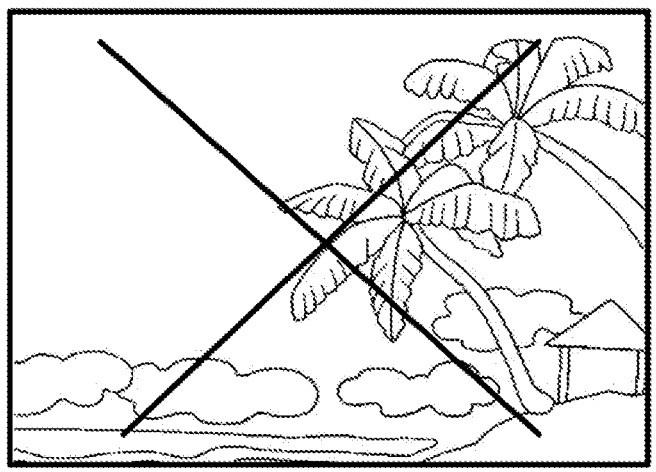
FIG. 15 is a schematic view of a photographed picture photographed by using the method for controlling flight consistent with the present disclosure and added with a first oblique line and a second oblique line.
Figure 16:
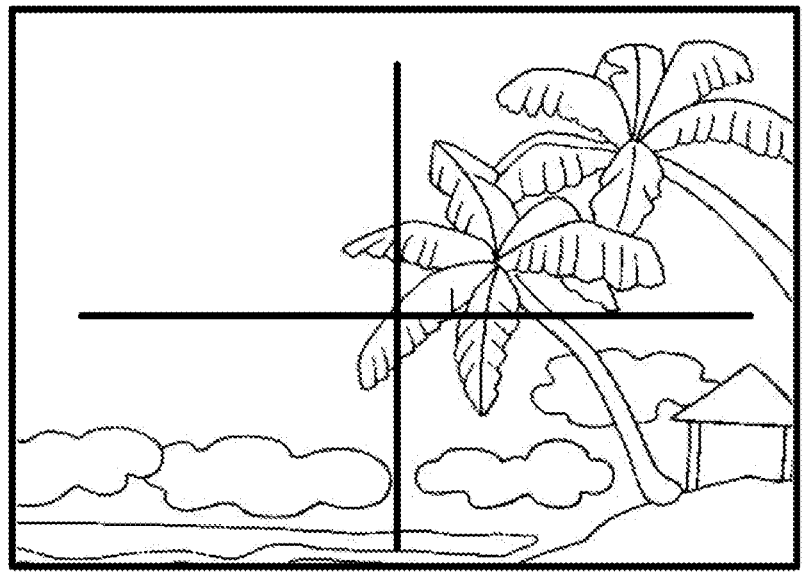
FIG. 16 is a schematic view of a photographed picture photographed by using the method for controlling flight consistent with the present disclosure and added with a horizontal line and a plumb line.

The prompt information may be a first oblique line and a second oblique line. FIG. 15 is a schematic view of a photographed picture photographed by using the method for controlling flight described above in connection with FIG. 14 and added with the first oblique line and the second oblique line. Alternatively, the prompt information may be a horizontal line and a plumb line. FIG. 16 is a schematic view of a photographed picture photographed by using the method for controlling flight described above in connection with FIG. 14 and added with the horizontal line and the plumb line.

Of course, the prompt information may also have other representations. For example, the prompt information may include color information added to each portion of the picture, and different color information represents different flight directions. Alternatively, the prompt information may include markup information provided in each portion of the picture, and different markup information represents different flight directions. The displaying of the color information or markup information is similar to that of the abovementioned embodiments, and will not be described again here.

In the method for controlling flight, the picture is divided into four portions based on the first oblique line and the second oblique line, or based on the horizontal line and the plumb line. The four portions respectively correspond to four directions of up, down, left and right, which enables users to control the flight of the aerial vehicle in those directions, thereby providing convenience for the users' use.

It should be understood by those skilled in the art that, the prompt information may also have other representations on the basis of the technical solutions disclosed in the above embodiments of the present disclosure. The number of the areas of the picture being divided by the prompt information may also be other values. For example, the picture may be divided into five areas, or more. Each area represents different flight directions. The flight direction of the aerial vehicle may also be divided in more detail ways, such as 10 degrees to the left, 20 degrees to the left, or the like.

Figure 17:
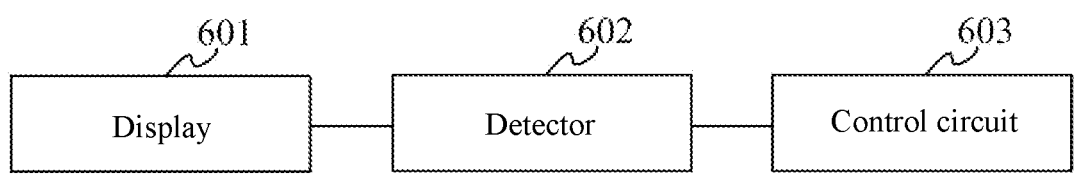
FIG. 17 is a structure block diagram of a device for controlling flight consistent with the present disclosure.

The present disclosure also provides a device for controlling flight. FIG. 17 is a structure block diagram of the device for controlling flight according to some embodiments of the present disclosure. As shown in FIG. 17, the device for controlling flight may comprise:

A display 601 configured to display prompt information in a photographed picture sent back by an aerial vehicle;

A detector 602 configured to obtain location information clicked by a user on the picture;

A control circuit 603 configured to control a flight direction of the aerial vehicle based on the location information of a click operation by the user and the prompt information.

The device for controlling flight as shown in FIG. 17 may be specifically used to perform the method for controlling flight shown in FIG. 1, and the specific implementation principle thereof is similar to that described above in connection with FIG. 1, and will not be described again here.

The device for controlling flight, by displaying the prompt information in the photographed picture sent back by the aerial vehicle, obtaining the location information of the click operation by the user on the picture, and controlling the flight direction of the aerial vehicle based on the location information of the click operation by the user and the prompt information, enables the user to intuitively control the flight direction of the aerial vehicle based on the specific location of the aerial vehicle, so as to provide users with convenience, effectively prevent the occurrence of flight accidents and improve the safety of aerial vehicle.

In some embodiments, the picture is divided into at least two portions based on the prompt information.

In some embodiments, the control circuit 603 is specifically configured to:

Control the aerial vehicle to fly along a first direction if the location information is located in a first portion of the at least two portions;

Control the aerial vehicle to fly along a second direction if the location information is located in a second portion of the at least two portions.

In some embodiments, the display 601 is further configured to:

Determine a direction of the obstacle or the no-fly zone with respect to the aerial vehicle if there is a specific obstacle or a no-fly zone within a preset distance from the aerial vehicle, and set a portion corresponding to the direction in the photographed picture as a no-clicking area, so as to invalidate a click operation of the user on the portion.

Wherein the specific obstacle or the no-fly zone is an obstacle or a no-fly zone with a range greater than a preset threshold.

In some embodiments, the device for controlling flight further comprises: a determining module;

The determining module is configured to, before displaying the prompt information in a displayed photographed picture, determine a base line in the photographed picture based on the attitude information of the photographing device, and determine the prompt information based on the base line.

Wherein the base line is a straight line or a curve line.

In some embodiments, the determining module is specifically configured to:

Before displaying the prompt information in the displayed photographed picture, determine a horizontal line in the photographed picture based on the attitude information of the photographing device, and determine the prompt information based on the horizontal line;

Correspondingly, the prompt information is configured to represent a relative position relationship between each portion of the picture and the horizontal line.

Wherein the first portion is an area above the horizontal line, and the second portion is an area below the horizontal line; the first direction is an ascending direction, and the second direction is a descending direction. In particular, when the clicked location is located in a first area, the aerial vehicle is controlled to fly along a certain direction above the horizontal line of the aerial vehicle; when the click location is located in a second area, the aerial vehicle is controlled to fly along a certain direction below the horizontal line.

The prompt information is a horizontal line; alternatively, the prompt information includes color information added to each portion of the picture, and different color information represents different flight directions; alternatively, the prompt information includes markup information provided in each portion of the screen, and different markup information represents different flight directions, wherein the markup information is an arrow or a character.

The control circuit 603 is further configured to: determine a flight distance of the aerial vehicle along the flight direction based on the distance between the location information of the click operation by the user on the photographed picture and the horizontal line.

In some embodiments, the determining module is specifically configured to:

Before displaying the prompt information in a displayed photographed picture, determine a plumb line in the photographed picture based on the attitude information of the photographing device, and determine the prompt information based on the plumb line;

Correspondingly, the prompt information is configured to represent a relative position relationship between each portion of the picture and the plumb line.

Wherein the first portion is an area on the left of the plumb line, and the second portion is an area on the right of the plumb line; the first direction is a left direction and the second direction is a right direction.

The prompt information is a plumb line; alternatively, the prompt information includes color information added to each portion of the picture, and different color information represents different flight directions; alternatively, the prompt information includes markup information provided in each portion of the picture, and different markup information represents different flight directions, wherein the markup information is an arrow or a character.

The control circuit 603 is further configured to: determine an angle by which the aerial vehicle rotated leftward or rightward based on a distance between the location information of the click operation by the user on the photographed picture and the plumb line.

In some embodiments, the determining module is specifically configured to:

Before displaying the prompt information in the displayed photographed picture, determine a first oblique line in the photographed picture based on the attitude information of the photographing device, and determine the prompt information based on the first oblique line, wherein an angle between the first oblique line and the plumb line is 45 degrees;

Correspondingly, the prompt information is configured to represent a relative position relationship between each portion of the picture and the first oblique line.

Wherein the first oblique line divides the picture into a first portion and a second portion; the direction corresponds to the first portion is an upper left direction, the direction corresponds to the second portion is a lower right direction; or the direction corresponds to the first portion is a lower left direction, the direction corresponds to the second portion is an upper right direction.

In some embodiments, the determining module is specifically configured to:

Before displaying the prompt information in the displayed photographed picture, determine a first oblique line and a second oblique line in the photographed picture based on the attitude information of the photographing device, and determine the prompt information based on the first oblique line and the second oblique line, wherein an angle between the first oblique line and the plumb line and an angle between the second oblique line and the plumb line are both 45 degrees; alternatively, determine the horizontal line and the plumb line of the photographed picture based on the attitude information of the photographing device, and determine the prompt information based on the horizontal line and the plumb line;

Correspondingly, the prompt information is configured to represent a relative position relationship between each portion of the picture and the first oblique line and the second oblique line, or a relative position relationship between each portion of the picture and the horizontal line and the plumb line.

Wherein the first oblique line and the second oblique line, or the horizontal line and the plumb line divide the picture into four portions; the directions corresponding to the four portions are a left direction, a right direction, an ascending direction and a descending direction, respectively.

Figure 18:
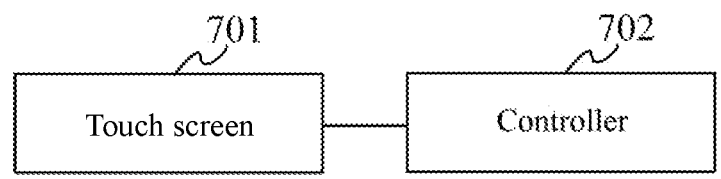
FIG. 18 is a structure block diagram of a control terminal consistent with the present disclosure.

The present disclosure also provides a control terminal. FIG. 18 is a structure block diagram of the control terminal consistent with some embodiments of the present disclosure. As shown in FIG. 18, the control terminal may comprise: a touch screen 701 and a controller 702 electrically connected to the touch screen 701;

The touch screen 701 is configured to display a photographed picture sent back by an aerial vehicle;

The controller 702 is configured to: control the touch screen 701 to display prompt information in the photographed picture; obtain location information clicked by a user on the picture; control a flight direction of the aerial vehicle based on the location information of a click operation by the user and the prompt information.

In some embodiments, the control terminal may be any terminal having a display screen, such as a mobile phone, a tablet computer, a remote controller, or the like. In addition to the display screen 701 and the controller 702, the control terminal may be provided with other components, such as a power source, a wireless communication device, and the like.

For the functions of the display screen 701 and the controller 702, reference may be made to the description above in connection with FIG. 1, and the specific implementation principles thereof are similar, which will not be described again here.

The control terminal, by displaying the prompt information in the photographed picture sent back by the aerial vehicle, obtaining location information of the click operation by the user on the picture and controlling the flight direction of the aerial vehicle based on the location information of the click operation by the user and the prompt information, enables the user to intuitively control the flight direction of the aerial vehicle based on the specific location of the aerial vehicle, so as to provide users with a convenience, effectively prevent the occurrence of flight accidents and improve the safety of the aerial vehicle.

In some embodiments, the picture is divided into at least two portions based on the prompt information.

In some embodiments, the controller 702 is specifically configured to: control the touch screen to display the prompt information in the photographed picture; obtain the location information clicked by the user on the picture; control the aerial vehicle to fly along a first direction if the location information is located in a first portion of the at least two portions; control the aerial vehicle to fly along a second direction if the location information is located in a second portion of the at least two portions.

In some embodiments, the controller 702 is further configured to:

Determine a direction of the obstacle or the no-fly zone with respect to the aerial vehicle if there is a specific obstacle or a no-fly zone within a preset distance from the aerial vehicle, and set a portion of the photographed picture corresponding to the direction as a no-clicking area, so as to invalidate a click operation of the user on the portion.

Wherein the specific obstacle or the no-fly zone is an obstacle or a no-fly zone with a range greater than a preset threshold.

In some embodiments, the controller 702 is further configured to:

Determine, a base line in the photographed picture, based on attitude information of the photographing device, and determine, the prompt information based on the base line.

Wherein the base line is a straight line or a curve line.

In some embodiments, the base line is a horizontal line;

Correspondingly, the prompt information is configured to represent a relative position relationship between each portion of the picture and the horizontal line.

The first portion is an area above the horizontal line, and the second portion is an area below the horizontal line; the first direction is an ascending direction, and the second direction is a descending direction.

The prompt information is a horizontal line; alternatively, the prompt information includes color information added to each portion of the picture, and different color information represents different flight directions; alternatively, the prompt information includes markup information provided in each portion of the picture, and different markup information represents different flight directions, wherein the markup information is an arrow or a character.

The controller 702 is further configured to: obtain, by the controller, a location clicked by a user on the picture; if a characteristic target point at the location is obtained, control the aerial vehicle to fly toward the target point, or if a direction of the clicked location with respect to the present location is obtained, control the aerial vehicle to fly along the direction.

When controlling the aerial vehicle to fly toward the target point, the controller further determines a flight distance of the aerial vehicle in the flight direction, based on a distance between the location information of the click operation by the user on the photographed picture and the horizontal line.

In some embodiments, the base line is a plumb line;

Correspondingly, the prompt information is configured to represent a relative position relationship between each portion of the picture and the plumb line.

The first portion is an area on the left of the plumb line, and the second portion is an area on the right of the plumb line; the first direction is a left direction and the second direction is a right direction.

The prompt information is a plumb line; alternatively, the prompt information includes color information added to each portion of the picture, and different color information represents different flight directions; alternatively, the prompt information includes markup information provided in each portion of the picture, and different markup information represents different flight directions, wherein the markup information is an arrow or a character.

The controller 702 is further configured to: determine an angle by which the aerial vehicle rotated leftward or rightward based on the distance between the location information of the click operation by the user on the photographed picture and the plumb line.

In some embodiments, the base line is a first oblique line, wherein an angle between the first oblique line and the plumb line is 45 degrees;

Correspondingly, the prompt information is configured to represent a relative position relationship between each portion of the picture and the first oblique line.

The first oblique line divides the picture into a first portion and a second portion; the direction corresponding to the first portion is an upper left direction, and the direction corresponding to the second portion is a lower right direction; or the direction corresponding to the first portion is a lower left direction, and the direction corresponding to the second portion is an upper right direction.

In some embodiments, the base line comprises a first oblique line and a second oblique line, wherein an angle between the first oblique line and the plumb line and an angle between the second oblique line and the plumb line are both 45 degrees; alternatively, the base line comprises a horizontal line and a plumb line;

Correspondingly, the prompt information is configured to represent a relative position relationship between each portion of the picture and the first oblique line and the second oblique line, or a relative position relationship between each portion of the picture and the horizontal line and the plumb line.

The first oblique line and the second oblique line, or the horizontal line and the plumb line divide the picture into four portions; the directions corresponding to the four portions are a left direction, a right direction, an ascending direction and a descending direction, respectively.

The present disclosure also provides a flight system. The flight system may comprise: an aerial vehicle and a control terminal wirelessly communicated with the aerial vehicle;

The control terminal is configured to: display prompt information in a photographed picture sent back by the aerial vehicle; obtain location information of the click operation by a user on the picture; control a flight direction of the aerial vehicle based on the location information of the click operation by the user and the prompt information;

The aerial vehicle comprises a propeller, a driving member and a flight controller;

The flight controller is configured to receive a flight direction sent by the control terminal, and control the driving member to rotate based on the flight direction;

The driving member is configured to drive the propeller to rotate under the control of the flight controller, so as to achieve a flight of the aerial vehicle. Wherein the driving member may be an electric motor.

In some embodiments, the aerial vehicle and the control terminal may be provided with wireless communication devices, respectively. The information transmission between the aerial vehicle and the control terminal may be implemented by the wireless communication devices.

The structure and function of the control terminal are similar to those of the above-mentioned embodiments, and will not be described again.

The flight system, by displaying the prompt information in the photographed picture sent back by the aerial vehicle, obtaining the location information of the click operation by the user on the picture and controlling the flight direction of the aerial vehicle based on the location information of the click operation by the user and the prompt information, enables the user to intuitively control the flight direction of the aerial vehicle based on the specific location of the aerial vehicle, so as to provide users with convenience, effectively prevent the occurrence of flight accidents and improve the safety of the aerial vehicle.

In some embodiments, the picture is divided into at least two portions based on the prompt information.

In some embodiments, the control terminal is specifically configured to: display the prompt information in the photographed picture sent back by the aerial vehicle; obtain the location information clicked by the user on the picture; control the aerial vehicle to fly along a first direction if the location information is located in a first portion of the at least two portions; control the aerial vehicle to fly along a second direction if the location information is located in a second portion of the at least two portions.

In some embodiments, the control terminal is further configured to:

Determine a direction of the obstacle or a no-fly zone with respect to the aerial vehicle if there is a specific obstacle or a no-fly zone within a preset distance from the aerial vehicle, and set a portion of the photographed picture corresponding to the direction as a no-clicking area, so as to invalidate a click operation of the user on the portion.

Wherein the specific obstacle or a no-fly zone is an obstacle or a no-fly zone with a range greater than a preset threshold.

In some embodiments, the control terminal is further configured to:

Determine a base line in the photographed picture based on the attitude information of the photographing device, and determine the prompt information based on the base line.

Wherein the base line is a straight line or a curve line.

In some embodiments, the base line is a horizontal line;

Correspondingly, the prompt information is configured to represent a relative position relationship between each portion of the picture and the horizontal line.

The first portion is an area above the horizontal line, and the second portion is an area below the horizontal line; the first direction is an ascending direction, and the second direction is a descending direction.

The prompt information is a horizontal line; alternatively, the prompt information includes color information added to each portion of the picture, and different color information represents different flight directions; alternatively, the prompt information includes markup information provided in each portion of the picture, and different markup information represents different flight directions, wherein the markup information is an arrow or a character.

The control terminal is further configured to: determine a flight distance of the aerial vehicle along the flight direction based on a distance between the location information of the click operation by the user on the photographed picture and the horizontal line.

In some embodiments, the base line is a plumb line;

Correspondingly, the prompt information is configured to represent a relative position relationship between each portion of the picture and the plumb line.

The first portion is an area on the left of the plumb line, and the second portion is an area on the right of the plumb line; the first direction is a left direction and the second direction is a right direction.

The prompt information is a plumb line; alternatively, the prompt information includes color information added to each portion of the picture, and different color information represents different flight directions; alternatively, the prompt information includes markup information provided in each portion of the picture, and different markup information represents different flight directions, wherein the markup information is an arrow or a character.

The control terminal is further configured to: determine an angle by which the aerial vehicle rotated leftward or rightward, based on the distance between the location information of the click operation by the user on the photographed picture and the plumb line.

In some embodiments, the base line is a first oblique line, wherein an angle between the first oblique line and the plumb line is 45 degrees; correspondingly, the prompt information is configured to represent a relative position relationship between each portion of the picture and the first oblique line.

The first oblique line divides the picture into a first portion and a second portion; the direction corresponding to the first portion is an upper left direction, and the direction corresponding to the second portion is a lower right direction; alternatively, the direction corresponding to the first portion is a lower left direction, and the direction corresponding to the second portion is an upper right direction.

In some embodiments, the base line comprises a first oblique line and a second oblique line, wherein an angle between the first oblique line and the plumb line and an angle between the second oblique line and the plumb line are both 45 degrees; alternatively, the base line comprises a horizontal line and a plumb line; correspondingly, the prompt information is configured to represent a relative position relationship between each portion of the picture and the first oblique line and the second oblique line, or a relative position relationship between each portion of the picture and the horizontal line and the plumb line.

The first oblique line and the second oblique line, or the horizontal line and the plumb line divide the picture into four portions;

Directions corresponding to the four portions are a left direction, a right direction, an ascending direction and a descending direction, respectively.

The present disclosure also provides a computer processor configured to perform the following program instructions:

Displaying, prompt information in a photographed picture sent back by an aerial vehicle;

Obtaining, location information clicked by a user on the picture;

Controlling, a flight direction of the aerial vehicle based on the location information of a click operation by the user and the prompt information.

The computer processor may be configured to perform the method described above in connection with FIG. 1, and the specific implementation principle thereof is similar to that described above in connection with FIG. 1, which will not be described again.

The computer processor, by displaying the prompt information in the photographed picture sent back by the aerial vehicle, obtaining location information of the click operation by the user on the picture, and controlling the flight direction of the aerial vehicle based on the location information of the click operation by the user and the prompt information, enables the user to intuitively control the flight direction of the aerial vehicle based on the specific location of the aerial vehicle, so as to provide users with convenience, effectively prevent the occurrence of flight accidents and improve the safety of the aerial vehicle.

In some embodiments, the picture is divided into at least two portions based on the prompt information.

The computer processor is specifically configured to perform the following program instructions:

Displaying, the prompt information in the photographed picture sent back by the aerial vehicle;

Obtaining, the location information clicked by the user on the picture;

Controlling, the aerial vehicle to fly along a first direction if the location information is located in a first portion of the at least two portions;

Controlling, the aerial vehicle to fly along a second direction if the location information is located in a second portion of the at least two portions.

The present disclosure also provides a memory configured to store program instructions, wherein the program instructions may be obtained by a processor to perform the following steps of:

Displaying, prompt information in a photographed picture sent back by an aerial vehicle;

Obtaining, location information clicked by a user on the picture;

Controlling, a flight direction of the aerial vehicle based on the location information of a click operation by the user and the prompt information.

The program instructions stored in the memory may be used to perform the method described above in connection with FIG. 1, and the specific implementation principle thereof is similar to that described above in connection with FIG. 1, which will not be described again.

The memory, in which program instructions are stored, by displaying the prompt information in the photographed picture sent back by the aerial vehicle, obtaining the location information of the click operation by the user on the picture, and controlling the flight direction of the aerial vehicle based on the location information of the click operation by the user and the prompt information, enables the user to intuitively control the flight direction of the aerial vehicle based on the specific location of the aerial vehicle, so as to provide users with convenience, effectively prevent the occurrence of flight accidents and improve the safety of the aerial vehicle.

In some embodiments, the picture is divided into at least two portions based on the prompt information.

The program instructions may be obtained by the processor to perform the following steps of:

Displaying, the prompt information in the photographed picture sent back by the aerial vehicle;

Obtaining, the location information of the click operation by the user on the picture;

Controlling, the aerial vehicle to fly along a first direction if the location information is located in a first portion of the at least two portions;

Controlling the aerial vehicle to fly along a second direction if the location information is located in a second portion of the at least two portions.

In several embodiments provided by the present disclosure, it should be appreciated that the related devices and methods disclosed may be implemented in other ways. For example, the embodiment of the device described above is merely illustrative. For example, the division of the module or unit is only a logical function division, and there may be other division ways when actually implementing. For example, multiple units or components may be combined or may be integrated into another system, or some features may be ignored or not performed. In another respect, coupling to one another or direct coupling or communication connection shown or discussed may be implemented through a number of interfaces, and indirect coupling or communication connection of the devices or units may be electrical, mechanical, or otherwise.

The units described as separation components may not be physically separate, and the components shown as units may or may not be physical units, i.e., may be located in one place or may be distributed over a plurality of network elements. Some or all elements thereof may be selected according to the actual needs to achieve the object of the present disclosure.

In addition, the functional units in the embodiments of the present disclosure may be integrated in one processing unit, or each functional unit may be separately physical presence, or two or more functional units may be integrated in one processing unit. The above-mentioned integrated unit may be implemented either in the form of hardware or in the form of software functional unit.

The integrated unit may be stored in a computer-readable storage medium if it is implemented in the form of a software functional unit and sold or used as a separate product. On the basis of this understanding, the essential technical solution of the present disclosure, or all or part of the technical solution may be embodied in the form of a software product. The software product may be stored in a storage medium and contain several instructions adapted to instruct a computer processor to perform all or some steps of the method according to the embodiments of the present disclosure. The aforementioned storage medium includes variety media that can store program instructions, such as a USB disk, a mobile hard disk, a read-only memory (ROM), a random access memory (RAM), a magnetic disk or an optical disk.

The above is merely an embodiment of the present disclosure and is not intended to limit the scope of the disclosure. All the equivalent construction or equivalent process transformation made based on the description and drawings of the present disclosure or direct or indirect application of the present disclosure in other related art are included in the scope of the present disclosure.

Finally, it should be noted that the above embodiments are merely provided for describing the technical solutions of the present disclosure, but not intended to limit the present disclosure. It should be understood by those of ordinary skill in the art that although the present disclosure has been described in detail with reference to the foregoing embodiments, modifications can be made to the technical solutions described in the foregoing embodiments, or equivalent replacements can be made to some or all technical features in the technical solutions, as long as such modifications or replacements do not cause the spirit and scope of corresponding technical solutions to depart from the scope of the present disclosure.

What is claimed is:

1. A method for controlling flight comprising:
   displaying, in a real-time manner, a picture photographed and sent by a photographing device carried by an aerial vehicle;
   determining a no-clicking area in the picture based on a position of an obstacle or a no-fly zone;
   receiving a click operation of a user on the picture; and
   controlling a flight of the aerial vehicle based on the click operation, including:
      invalidating the click operation in response to determining a click location of the click operation being in the no-clicking area; and
      controlling the flight of the aerial vehicle based on a position of the click location in response to determining the click location being not in the no-clicking area.

2. The method of claim 1, further comprising:
   displaying the no-clicking area in the picture by at least one of:
      covering the no-clicking area with a color or shadow; or
      displaying a prompt sign in the no-clicking area.

3. The method of claim 1, further comprising:
   determining at least one base line in the picture based on attitude information of the photographing device for photographing the picture;
   wherein determining the no-clicking area includes determining the no-clicking area in the picture based on the position of the obstacle or the no-fly zone relative to the at least one base line.

4. The method of claim 3, wherein controlling the flight of the aerial vehicle based on the position of the click location includes:
   controlling the flight of the aerial vehicle based on the position of the click location relative to the at least one base line, in response to determining the click location being not in the no-clicking area.

5. The method of claim 3, further comprising:
   determining the attitude information of the photographing device based on a state of the photographing device determined based on a reference line, a reference plane, or a reference coordinate system.

6. The method of claim 5, wherein the attitude information of the photographing device is same as or different from a flight attitude of the aerial vehicle.

7. The method of claim 3, further comprising:
   displaying the at least one base line in the picture.

8. The method of claim 7, wherein the at least one base line includes at least one of a straight line or a curve line.

9. The method of claim 7, wherein the at least one base line includes at least one of a horizontal line, a plumb line, or an oblique line.

10. The method of claim 1, wherein determining the no-clicking area in the picture includes:
    determining whether the obstacle or the no-fly zone is detected within a preset distance from the aerial vehicle; and
    in response to the obstacle or the no-fly zone is detected within the preset distance from the aerial vehicle, determining the no-clicking area in the picture.

11. The method of claim 10, wherein determining the no-clicking area in the picture further includes:
    determining a range of the obstacle or the no-fly zone through at least one of:
       a detection device including a radar; or
       imaging analyzing and processing; and
    determining the no-clicking area in the picture further based on the range.

12. The method of claim 10, wherein the range of the obstacle or the no-fly zone includes:
    a volume of the obstacle or the no-fly zone;
    a sectional area of the obstacle or the no-fly zone; or
    a projection area of the obstacle or the no-fly zone in a flight direction of the aerial vehicle.

13. The method of claim 1, further comprising:
    sending, in response to determining the click location being in the no-clicking area, a reminder message to the user to remind the user that the click location is in the no-clicking area.

14. The method of claim 13, wherein the reminder message includes at least one of text, image, video, or audio.

15. The method of claim 1, further comprising:
    determining at least one base line in the picture based on attitude information of the photographing device capturing the picture;
    determining prompt information based on the at least one base line; and
    displaying prompt information in the picture.

16. The method of claim 15, wherein:
    the at least one base line divides the picture into a plurality of portions; and the prompt information is configured to represent a relative position relationship between each of the plurality of portions of the picture and the at least one base line.

17. The method of claim 16, wherein the prompt information is configured to indicate different flight directions for different ones of the plurality of portions of the picture.

18. The method of claim 17, wherein the prompt information includes at least one of:
color information added to each of the plurality of portions of the picture, different color information representing different flight directions; or
markup information provided in each of the plurality of portions of the picture, different markup information representing different flight directions, and the markup information including an arrow or a character.

19. The method of claim 16, wherein determining the at least one base line in the picture based on attitude information of the photographing device includes at least one of:
determining a first oblique line in the picture based on the attitude information of the photographing device, an angle between the first oblique line and a plumb line being 45 degrees, and the prompt information being configured to represent a relative position relationship between each of the plurality of portions of the picture and the first oblique line;
determining the first oblique line and a second oblique line in the picture based on the attitude information of the photographing device, an angle between the second oblique line and the plumb line being 45 degrees, and the prompt information being configured to represent a relative position relationship between each portion of the picture and the first oblique line and/or between each of the plurality of portions of the picture and the second oblique line; or
determining a horizontal line and the plumb line of the picture based on the attitude information of the photographing device, the prompt information being configured to represent a relative position relationship between each portion of the picture and the horizontal line and/or between each of the plurality of portions of the picture and the plumb line.

20. A control terminal for controlling an aerial vehicle, comprising:
a touch screen; and
a controller electrically connected to the touch screen and configured to:
control the touch screen to display, in a real-time manner, a picture photographed and sent by a photographing device carried by the aerial vehicle;
determine a no-clicking area in the picture based on a position of an obstacle or a no-fly zone;
receive a click operation of a user on the picture; and
control a flight of the aerial vehicle based on the click operation, including:
invalidating the click operation in response to determining a click location of the click operation being in the no-clicking area; and
controlling the flight of the aerial vehicle based on a position of the click location in response to determining the click location being not in the no-clicking area.

* * * * *